United States Patent Office 3,031,452
Patented Apr. 24, 1962

3,031,452
DERIVATIVES OF THIAXANTHENONE
Tsung Y. Shen, Metuchen, Edward F. Rogers, Middletown, and Lewis H. Sarett, Princeton, N.J., assignors to Merck & Co., Inc., Rahway, N.J., a corporation of New Jersey
No Drawing. Filed Oct. 14, 1958, Ser. No. 767,102
4 Claims. (Cl. 260—268)

This invention relates to the production of derivatives of thiaxanthenone which are useful, for example, as chemotherapeutic agents for treating schistosomiasis, and also relates to the production of amines which can be employed as intermediates in the production of thiaxanthenone derivatives useful for the purpose mentioned.

The invention provides novel chemotherapeutic thiaxanthenone compounds of the formula:

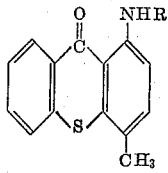
(I)

wherein R is a radical selected from the group consisting of:

3-N-ethylpiperidyl,
2-N-ethylpiperidylmethyl,
2-N-ethylpyrrolidylmethyl, and
β-(1-4-β-hydroxyethylpiperazinyl) ethyl.

The chemotherapeutic thiaxanthenone compounds can be produced by heating an admixture of 1-amino-4-methyl-thiaxanthenone and a halogen of the radical R, or an admixture of 1-halogen-4-methyl-thiaxanthenone and a primary amine of the radical R, R having the meaning assigned to it above in reference to the composition of the chemotherapeutic thiaxanthenone compounds, and with the proviso that the particular reactant primary amine or halogen of the radical R which is employed contain the radical R of the thiaxanthenone derivative produced. The halogen is preferably chloro. Conveniently, production is effected by reacting 1-halogen-4-methyl-thiaxanthenone with a primary amine of the radical R, i.e. $RNH_2$.

The starting material 1-chloro-4-methyl-thiaxanthenone can be prepared in a manner known in the art by reacting thiosalicylic acid and p-chlorotoluene to obtain a crude mixture of 1-chloro-4-methylthiaxanthenone and isomeric 4-chloro-1-methylthiaxanthenone. This crude mixture can be used in the method of the invention as only the 1-chloro-4-methyl isomer reacts and the 4-chloro-1-methyl isomer is recovered unchanged. The starting amine $RNH_2$ can be prepared in ways described hereinafter.

The reaction of 1-chloro-4-methyl-thiaxanthenone and amine $RNH_2$ is preferably effected by refluxing the thiaxanthenone starting material and amine in a solvent such as for example, xylene or pyridine for a time sufficient to permit the desired reaction.

Thus, according to the invention, chemotherapeutic thiaxanthenone compounds can be prepared by reacting 1-chloro-4-methyl-thiaxanthenone with the reactant intermediate primary amines:

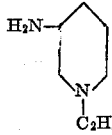
(III)
N-ethyl-3-aminopiperidine

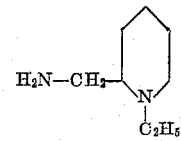
N-ethyl-2-aminomethylpiperidine
(IV)

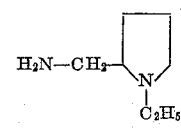
N-ethyl-2-aminomethylpyrrolidine
(V)

1-β-aminoethyl-4-β-hydroxyethylpiperazine
(VII)

to obtain, respectively,

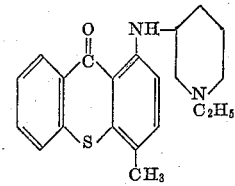
1-(3-N-ethylpiperidylamino)-4-methyl-10-thiaxanthenone
(XXI)

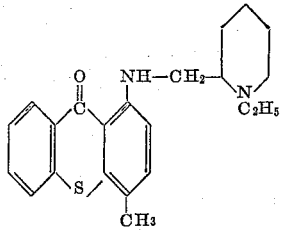
1-(2-N-ethylpiperidylmethylamino)-4-methyl-10-thiaxanthenone
(XXII)

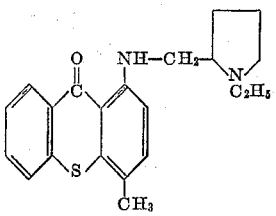
1-(2-N-ethylpyrrolidylmethylamino)-4-methyl-10-thiaxanthenone
(XXIII)

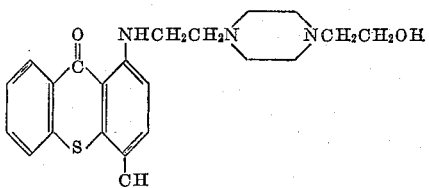
1-(β-4'-hydroxyethylpiperazinylethylamino)-4-methyl-10-thiaxanthenone
(XXV)

Another thiaxanthenone compound useful as a chemotherapeutic agent for treating schistosomiasis is:

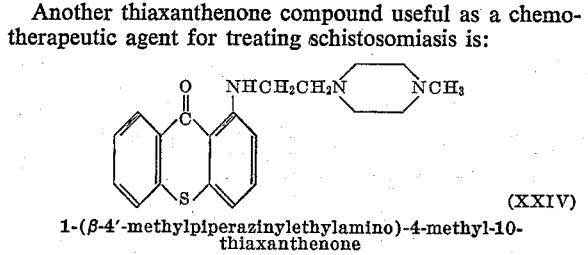
1-(β-4'-methylpiperazinylethylamino)-4-methyl-10-thiaxanthenone
(XXIV)

which can be prepared by reacting 1-chloro-4-methyl-thiaxanthenone with

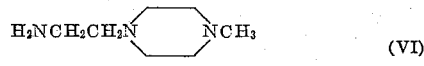

1-β-aminoethyl-4-methylpiperazine in the manner, described above, for producing the chemotherapeutic thiaxanthenone compounds of the invention. The chemotherapeutic thiaxanthenone compound XXIV is not claimed in the instant application, nor is the method of preparation thereof from 1-chloro-4-methylthiaxanthenone.

In the present application, the above-mentioned reactant intermediate primary amines IV and VII are claimed. Thus, the invention provides as novel compounds, amines of the formula R'NH

wherein R' is a radical selected from the group consisting of:

2-N-ethylpiperidylmethyl, and
β-(1-4-β-hydroxyethylpiperazinyl) ethyl.

Regarding production of the amines reacted with 1-chloro-4-methylthiaxanthenone to produce the chemotherapeutic agents described hereinbefore, compound III can be prepared by known means, and compound V can be prepared by a ring contraction reaction shortly to be described. Compounds IV, VI and VII can be prepared by reacting corresponding halogen precursor compounds with anhydrous ammonia, or by hydrogenation of the corresponding cyano precursor compounds.

According to the invention where compounds IV, VI and VII are produced employing anhydrous ammonia, the method involves production of amines of the formula:

R''NH

wherein R'' is a radical selected from the group consisting of:

2-N-ethylpiperidylmethyl,
β-(1-4-methylpiperazinyl) ethyl, and
β-(1-4-β-hydroxyethylpiperazinyl) ethyl, (which radicals correspond, respectively, with compounds IV, VI and VII) by admixing a halogen derivative of one of the radicals with anhydrous ammonia and heating the resulting admixture. The halogen derivative employed can be chloro, bromo, or iodo and is preferably the chloro derivative. In the case of compound VI, where the chloro derivative is employed, yields of 38% can be obtained. The chloro derivatives can be produced by treating the corresponding hydroxy derivatives with hydrogen chloride and thionyl chloride.

Retreating a step further in the synthesis of compounds IV and VI, in the case of compound IV, the hydroxy compound employed in the synthesis can be derived by preparing N-acetyl-2-acetoxymethylpiperidine by hydrogenation in the presence of ruthenium on carbon of 2-acetoxymethylpyridine which in turn is derived from picoline-N-oxide, and then heating an admixture of the N-acetyl-2-acetoxymethylpiperidine and lithium aluminum hydride in a suitable reaction medium to produce the hydroxy compounds, i.e. N-ethyl-2-hydroxymethylpiperidine. Alternatively, this hydroxy compound can be prepared from 2-hydroxymethylpyridine by hydrogenation thereof in the presence of a hydrogenation catalyst.

In the case of compound VI, the hydroxy compound converted to the chloro compound which in turn is converted to compound VI, can be produced by N-methylation of 1-β-hydroxyethylpiperazine carried out by heating an admixture of 1-β-hydroxyethylpiperazine, formaldehyde and formic acid. Alternatively, the hydroxy compound for the production of compound VI can be produced by hydroxyethylation of 1-methylpiperazine.

According to the invention, where compounds IV, VI and VII are produced by hydrogenation of the corresponding cyano precursor compounds, the method involves admixing a cyano compound of the formula R'''CN

wherein R''' is a radical selected from the group consisting of:

2-N-ethylpiperidyl,
1-4-methylpiperazinylmethyl, and
1-4-β-hydroxyethylpiperazinylmethyl, anhydrous ammonia and hydrogen in the presence of a hydrogenation catalyst and maintaining the resulting admixture at a superatmospheric pressure and an elevated temperature for a time sufficient to form the amine of the radical included in the admixture.

To produce the compound R'''CN wherein R''' is 1-4-β-hydroxyethylpiperazinylmethyl, i.e. where R'''CN is suitable for the production of compound VII which is 1-β-aminoethyl-4-β-hydroxyethylpiperazine, the cyano derivative can be obtained by converting 1-β-hydroxyethylpiperazine to a crystalline sodium sulfonate which in turn is treated with potassium cyanide to give the desired cyano derivative in good overall yield (e.g. 63%), or by the direct alkylation of 1-β-hydroxyethylpiperazine with chloroacetonitrile.

Compound VI can also be prepared by reacting a halogen derivative of the β-(1-4-methylpiperazinyl) ethyl radical with benzylamine to give 1-β-benzylaminoethyl-4-methylpiperazine which can be subjected to hydrogenation to yield compound VI. This method, however, is not preferred.

The amine compound V, according to the invention is produced by a reaction involving ring contraction. The method involves admixing N-ethyl-3-chloropiperidine and anhydrous ammonia and maintaining the resulting admixture at an elevated temperature. The temperature can be in the range of about 100° to 200° C., and preferably is between about 115° and 160° C. Conveniently, yields of 50% can be obtained.

The thiaxanthenone derivatives of the invention are useful as chemotherapeutic agents for the treating of schistosomiasis. They are preferably employed for this purpose in the form of hydrohalides, especially the hydrochlorides. These materials can be administered in the form, dosage and as the known antischistosome agent 1-methyl - 4 - β - diethylaminoethylaminothioxanthone hydrochloride (Miracil D) is administered.

EXAMPLE I (Compound XXI)

*1-(3-N-Ethylpiperidylamino)-4-Methyl-10-Thiaxanthenone Hydrochloride*

A solution of 16 g. of a mixture of 1-chloro-4-methyl-10-thiaxanthenone and its 4-chloro-1-methyl isomer and 10 g. of N-ethyl-aminopiperidine in 250 ml. of xylene was heated at the reflux temperature for 18 hours in the presence of 10 g. of sodium bicarbonate. The xylene solution was cooled to room temperature, washed with water, and the product was extracted with dilute hydrochloric acid. The extract was poured into excess of conc. ammonium hydroxide and 300 ml. of ice, and the free base liberated was extracted with ether. The ethereal solution was dried over potassium carbonate, filtered and treated with ethanolic hydrogen chloride. The salt was collected and recrystallized from ethanol, M.P. 250–251° (5.5 g.). An analytical sample was recrystallized from ethanol, M.P. 252–252.5°.

*Analysis.*—Calcd. for $C_{21}H_{25}N_2OSCl$: C, 64.85; H, 6.49; N, 7.20. Found: C, 64.87; H, 6.56; N, 6.90.

EXAMPLE II

In this example compound XXII is produced from compound IV. Compound IV is derived from N-ethyl-2-chloromethylpiperidine hydrochloride which is made from N-ethyl-2-hydroxymethylpiperidine which is obtained alternatively from 2-acetoxymethylpyridine or 2-hydroxymethylpyridine.

N-Ethyl-2-Hydroxymethylpiperidine (a) *From 2-acetoxymethylpyridine.*—A solution of 117 g. of 2-acetoxymethylpyridine, prepared from picoline-N-oxide, in 300 ml. of ethanol was shaken under hydrogen at 1900 p.s.i. at 19° for 20 hrs. in the presence of 10 g. of 10% ruthenium on carbon. The solution was filtered and concentrated under reduced pressure to ca. 200 ml. After the addition of 100 ml. of acetic anhydride the solution was again concentrated under reduced pressure to ca. 200 ml., and was stored at room temperature for 18 hours. Fractionation of the reaction mixture through a 8″ Vigreux column afforded 23.6 g. of N-acetyl-2-acetoxymethylpiperidine, B.P. 135° (0.8 mm.), $n_D^{25}$ 1.4850.

*Analysis.*—Calcd. for $C_{10}H_{17}O_3N$: C, 60.26; H, 8.62; N, 7.06. Found: C, 60.36; H, 8.35; N, 6.98.

To a suspension of 8 g. of lithium aluminum hydride in 800 ml. of tetrahydrofuran was added slowly with ice-cooling and stirring a solution of 19.9 g. of N-acetyl-2-acetoxymethylpiperidine in 40 ml. of tetrahydrofuran. The mixture was stirred at 0° for 0.5 hr., at room temperature for 2 hrs., and was then heated at the reflux temperature for 2 hrs. After the addition of ethyl acetate and 20 ml. of ice-water with cooling, the supernatent solution was decanted. The solid residue was dissolved in dilute sodium hydroxide and extracted continuously with ether for 24 hrs. The ethereal extract was combined with the tetrahydrofuran solution, dried over potassium carbonate, filtered, concentrated, and fractionated. N-ethyl-2-hydroxymethylpiperidine (8.6 g.) was collected at B.P. 102° (16 mm.), $n_D^{23}$ 1.4834.

*Analysis.*—Calcd. for $C_8H_{17}NO$: C, 67.08; H, 11.97. Found: C, 67.16; H, 11.62.

(b) *From 2-hydroxymethylpyridine.*—A solution of 250 g. of 2-hydroxymethylpyridine in 450 ml. of ethanol was hydrogenated at 100–125° under 4200 p.s.i. in the presence of a Raney nickel catalyst. The solution was filtered and treated with 250 g. of ethyl bromide and 180 g. of potassium carbonate at room temperature for 3.5 days with occasional shaking. The reaction mixture was filtered, concentrated under reduced pressure to a syrup and filtered again. The solid was dissolved in 200 ml. of water, saturated with potassium carbonate and extracted with chloroform. The chloroform extract was combined with the syrup and distilled to afford 223 g. (68%) of N-ethyl-2-hydroxymethylpiperidine.

N-Ethyl-2-Chloromethylpiperidine Hydrochloride

A solution of 75 g. of N-ethyl-2-hydroxymethylpiperidine in 500 ml. of chloroform was treated with excess hydrogen chloride with ice-cooling. Thionyl chloride (90 g.) was added slowly with stirring and ice-cooling and the mixture was stirred at room temperature for 1 hr. followed by heating at the reflux temperature for 1 hr. The solution was evaporated under reduced pressure to a semi-solid which was recrystallized from ethanol-ethyl acetate as white needles, M.P. 197°. The yield was 64 g.

*Analysis.*—Calcd. for $C_8H_{17}NCl_2$: C, 48.5; H, 8.67. Found: C, 48.91; H, 8.70.

N-Ethyl-2-Aminomethylpiperidine (Compound IV)

A solution of 20 g. of N-ethyl-2-chloromethylpiperidine hydrochloride in 60 ml. of anhydrous ammonia was heated at 100° for 6 hrs. After evaporation of solvent the residue was dissolved in saturated potassium carbonate and extracted with chloroform. Distillation of the chloroform extract afforded 14.5 g. of the amine, B.P. 90° (16 mm.), $n_D^{25}$ 1.4760.

*Analysis.*—Calcd. for $C_8H_{18}N_2$: C, 67.55; H, 12.75. Found: C, 67.11; H, 12.15.

N-ethyl-2-aminomethylpiperidine dipicrate was prepared from the amine and picric acid in ethanol and recrystallized from methanol-ethanol, M.P. 204° (dec.).

*Analysis.*—Calcd. for $C_{20}H_{24}N_8O_{14}$: C, 40.0; H, 4.0. Found: C, 40.31; H, 3.95.

1-(2-N-Ethylpiperidylmethylamino)-4-Methyl-10-Thiaxanthenone Hydrochloride (Hydrochloride of Compound XXII)

A mixture of 40 g. of isomeric chloromethyl-thiaxanthenone, 30 g. of N-ethyl-2-aminomethylpiperidine and 20 ml. of pyridine was heated at the reflux temperature for 16 hrs. The reaction mixture was treated with excess of dilute sodium carbonate, and the precipitate was collected and digested with acetic acid. After dilution with 3 volumes of water the acetic acid solution was filtered, and was then neutralized with ammonium hydroxide. The free base separated was collected, dissolved in ethanol and treated with ethanolic hydrogen chloride. The salt was recrystallized from ethanol, M.P. 218° (9.5 g.).

*Analysis.*—Calcd. for $C_{22}H_{27}N_2OSCl$: C, 65.7; H, 6.72; N, 6.97. Found: C, 66.11; H, 6.57; N, 6.74.

EXAMPLE III

In this example compound XXIII is produced from compound V.

N-Ethyl-2-Aminomethylpyrrolidine (Compound V)

A solution of 37 g. of N-ethyl-3-chloropiperidine hydrochloride in 150 ml. of anhydrous ammonia was heated at 150° for 6 hrs. After evaporation of the solvent the residue was dissolved in saturated potassium carbonate and extracted with chloroform. Evaporation and fractionation of the chloroform extract afforded 14.3 g. of N-ethyl-2-aminomethylpyrrolidine B.P. 71° (16 mm.), $n_D^{25}$ 1.4710. It formed a dipicate with ethanolic picric acid, M.P. 180°. The M.P. of the dipicate recorded was 180°.

1-(2-N-Ethylpyrrolidylmethylamino)-4-Methyl-10-Thiaxanthenone Hydrochloride (Hydrochloride of Compound XXIII)

A solution of 45 g. of N-ethyl-2-aminomethylpyrrolidine and 75 g. of isomeric chloro-thiaxanthenones in 70 ml. of pyridine was heated at the reflux temperature for 18 hours. After the addition of 200 g. of phenol, the reaction mixture was distilled until the boiling point of the distillate reached 150°. The remaining solution was heated at reflux temperature again for 1 hour and was then poured into 2 l. of iced water containing excess sodium hydroxide. The precipitate was filtered and digested in 20% acetic acid. The acid solution was filtered and treated with excess of ammonium hydroxide. The precipitate formed was dissolved in ethanol and treated with ethanolic hydrogen chloride. The salt was collected and recrystallized from ethanol to afford 10.2 g. of the product, M.P. 230–232°.

*Analysis.*—Calcd. for $C_{21}H_{25}N_2OSCl$: C, 64.85; H, 6.48; N, 7.20. Found: C, 63.43; H, 6.63; N, 7.11.

EXAMPLE IV

In this example compound XXIV is produced from compound VI. Compound VI is made from 1-β-chloroethyl-4-methylpiperazinedihydrochloride which is derived from 1-β-hydroxyethyl-4-methylpiperazine.

1-β-Hydroxyethyl-4-Methylpiperazine

A solution of 80 g. of 1-β-hydroxyethylpiperazine and 100 ml. of 37% formaldehyde in 350 ml. of formic acid was warmed on a steam cone until an exothermic reaction took place with evolution of carbon dioxide. After the reaction subsided the solution was heated again on a steam cone for 4 hrs. To the reaction mixture was added 100 ml. of conc. hydrochloric acid and the heating was continued for another 16 hrs. The solution was concentrated under reduced pressure to a syrup and fractionated through an 8" Vigreux column. The distillate (93 g.) collected at 121–123° (20 mm.), $n_D^{25}$ 1.4742–66, was further treated with excess methanolic barium methoxide at room temperature for 16 hrs. The mixture was treated with a few ml. of water, filtered and concentrated. Distillation of the product afforded 60 g. of 1-β-hydroxyethyl-4-methylpiperazine, B.P. 120° (16 mm.), $n_D^{25}$ 1.4874.

*1-β-Chloroethyl-4-Methylpiperazinedihydrochloride*

1-β-hydroxyethyl-4-methylpiperazine (60 g.) was dissolved in 500 ml. of chloroform and treated with an excess of hydrogen chloride. After the addition of 100 ml. of thionyl chloride the mixture was heated under reflux with stirring for 4 hrs. The solvent was then removed under reduced pressure and the residual white solid was heated under reflux in 120 ml. of thionyl chloride for 1 hr. followed by standing at room temperature for 64 hrs. The mixture was evaporated to dryness under reduced pressure and the resulting product was recrystallized from ethanol, M.P. 279–280° (dec.). The yield was 93 g.

*Analysis.*—Calcd. for $C_7H_{11}N_2Cl_3$: C, 35.75; H, 7.30; N, 11.90. Found: C, 35.73; H, 7.03; N, 11.50.

*1-β-Aminoethyl-4-Methylpiperazine (Compound VI)*

A mixture of 160 g. of 1-β-chloroethyl-4-methylpiperazine dihydrochloride and 500 ml. of anhydrous ammonia was heated at 130° for 8 hrs. After evaporation of solvent the residue was dissolved in saturated potassium carbonate and extracted first with ether, then with chloroform. Fractionation of the ethereal extract afforded 33 g. of 1-β-aminoethyl-4-methylpiperazine, B.P. 93° (16 mm.), $n_D^{25}$ 1.4772. The free base formed a trihydrochloride which was recrystallized from aqueous ethanol, M.P. 254–255.5° (dec.).

*Analysis.*—Calcd. for $C_7H_{20}N_3Cl_3$: C, 33.36; H, 7.94; N, 16.67. Found: C, 33.88; H, 7.86; N, 16.52.

*1-(β - 4' - Methylpiperazinylethylamino) - 4 - Methyl-10-Thiaxanthenone Dihydrochloride (Hydrochloride of Compound XXIV)*

A mixture of 25 g. of 1-β-aminoethyl-4-methylpiperazine, 40 g. of methyl-chloro-thiaxanthenones and 25 g. of pyridine was heated at the reflux temperature for 20 hrs. The solution was poured into 0.5 N of sodium hydroxide and the precipitate was filtered, washed with water and redissolved in hot 10% acetic acid. The acid solution was filtered and made alkaline with excess of ammonium hydroxide. The precipitate was dissolved in ethanol and treated with excess of ethanolic hydrogen chloride. After dilution with ether, the product was collected and recrystallized from ethanol-ether to afford 3.1 g. of the product, M.P. 267–268.5°.

*Analysis.*—Calcd. for $C_{21}H_{27}N_3OSCl_2 \cdot H_2O$: C, 55.2; H, 6.38; N, 9.18. Found: C, 55.64; H, 6.68; N, 9.02.

EXAMPLE V

In this example compound XXV is made employing compound VII. Compound VII was derived from 1-cyanomethyl-4-β-hydroxyethylpiperazine, which was derived in two ways, first from 1-β-hydroxyethylpiperazine by conversion of the latter to a crystalline sodium sulfonate which was then treated with potassium cyanide, and second by alkylation of 1-β-hydroxyethylpiperazine with chloroacetonitrile.

*1-Cyanomethyl-4-β-Hydroxyethylpiperazine*

(a) *From crystalline sodium sulfonate.*—A solution of 0.18 mole of sodium bisulfite and 0.18 mole of formaldehyde in 35 ml. of water was mixed with 20 g. of 1-β-hydroxyethylpiperazine with stirring and cooling. The white precipitate formed was collected on a filter, washed with ethanol and dried. The product was redissolved in 30 ml. of water. After the addition of 12 g. of potassium cyanide, the mixture was heated on a steam bath with occasional shaking for one hr. Excess of potassium carbonate was added, and the product was extracted with chloroform. Evaporation of the chloroform solution gave a brown syrup, and this was again extracted with three portions of 150 ml. of ether leaving a solid residue, M.P. 80°. The ethereal solution was concentrated and the product was distilled at B.P. 113–114° (0.2 mm.), $n_D^{22}$ 1.5062. The oil crystallized on cooling, M.P. 40°. The yield was 16.3 g. (63%).

*Analysis.*—Calcd. for $C_8H_{15}N_3O$: C, 56.8; H, 8.88; N, 24.9. Found: C, 56.19; H, 8.51; N, 25.07.

The product formed a dihydrochloride, which was recrystallized from a mixture of methanol and ethanol, M.P. 201° (dec.).

*Analysis.*—Calcd. for $C_8H_{17}N_3OCl_2$: C, 39.7; H, 7.02; N, 17.35. Found: C, 39.87; H, 6.89; N, 16.86.

The product was further characterized as its acetate, 1-cyanomethyl-4-β-acetoxyethylpiperazine, B.P. 120° (0.1 mm.).

*Analysis.*—Calcd. for $C_{10}H_{17}N_3O_2$: C, 56.9; H, 8.12; N, 19.92. Found: C, 56.93; H, 7.67; N, 19.40.

The ether-insoluble residue, M.P. 80°, was recrystallized from a mixture of benzene and chloroform to afford an analytical pure sample, M.P. 92–93°. This by-product was identified as 1-carbamylmethyl-4-β-hydroxyethylpiperazine.

*Analysis.*—Calcd. for $C_8H_{17}N_3O_2$: C, 51.3; H, 9.1. Found: C, 51.36; H, 8.27.

The amide was acetylated with acetic anhydride to form 1-carbamylmethyl-4-β-acetoxyethylpiperazine, recrystallized from benzene pet. ether, M.P. 81°.

*Analysis.*—Calcd. for $C_{10}H_{19}N_3O_3$: C, 52.45; H, 8.3; N, 18.3. Found: C, 52.79; H, 8.00; N, 17.92.

(b) *By alkylation.*—A mixture of 12 g. of 1-β-hydroxyethylpiperazine and 8 g. of chloroacetonitrile was heated in 200 ml. of ethanol at the reflux temperature for 18 hrs. The solution was evaporated to a syrup under reduced pressure, and the syrup was redissolved in chloroform. The solution was washed with 10% sodium hydroxide solution and dried over potassium carbonate. Evaporation of the chloroform solution gave a syrup which was extracted with three portions of 100 ml. of ether. The ethereal solution was evaporated and fractionated to give the product, B.P. 114° (0.2 mm.), which crystallized on cooling, M.P. 39–40° (7.4 g.).

*1-β-Aminoethyl-4-β-Hydroxyethylpiperazine (Compound VII)*

A solution of 11 g. of 1-cyanomethyl-4-β-hydroxyethylpiperazine in 35 ml. of ethanol and 25 g. of anhydrous ammonia was hydrogenated in the presence of one teaspoonful of Raney nickel catalyst under 1700 p.s.i. at 100° for 6 hrs. The solution was filtered and concentrated under reduced pressure. The residual syrup was distilled in a short-path distillation apparatus with a bath temp. of 200° (1 mm.) to afford 10.1 g. of the product, $n_D^{24}$ 1.5140.

The product formed a trihydrochloride which was recrystallized from aqueous ethanol, M.P. 241–243°.

*Analysis.*—Calcd. for $C_8H_{22}N_3OCl_3$: C, 34.1; H, 7.8; N, 14.85. Found: C, 34.58; H, 7.49; N, 15.16.

*1-(β-4'-Hydroxyethylpiperazinylethylamino) - 4 - Methyl-10-Thiaxanthenone Dihydrochloride (Hydrochloride of Compound XXV)*

A mixture of 3 g. of 1-β-aminoethyl-4-β-hydroxyethylpiperazine and 5 g. of isomeric chloromethyl-thiaxanthenones was heated in 5 ml. of pyridine at the reflux temp. for 22 hrs. The solution was poured into dilute sodium hydroxide and the precipitate was collected and digested with 50 ml. of 20% acetic acid containing 2 ml. of hydrochloric acid. The reddish solution was filtered and neutralized with dilute sodium hydroxide. The precipitate formed was collected and washed thoroughly with water. It was redissolved in ethanol and the solution was treated with excess of ethanolic hydrogen chloride. The dark red solution was evaporated under reduced pressure, and the residue was recrystallized from aqueous ethanol as yellow needles, M.P. 238–240° (1.1 g.).

*Analysis.*—Calcd. for $C_{22}H_{29}N_3O_2SCl_2$: C, 56.25; H, 6.23; N, 8.94. Found: C, 56.02; H, 6.18; N, 8.92.

All temperatures, unless otherwise indicated, are in degrees centigrade.

What is claimed is:

1. A compound of the formula:

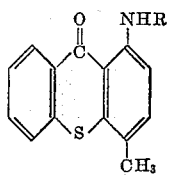

wherein R is a radical selected from the group consisting of:

3-N-ethylpiperidyl.
2-N-ethylpiperidylmethyl, and
β-(1-4-β-hydroxyethylpiperazinyl) ethyl.

2. A compound according to claim 1 wherein R is the 3-N-ethylpiperidyl radical.

3. A compound according to claim 1 wherein R is the 2-N-ethylpiperidylmethyl radical.

4. A compound according to claim 1 wherein R is the β-(1-4-β-hydroxyethylpiperazinyl) ethyl radical.

References Cited in the file of this patent

UNITED STATES PATENTS

| | | |
|---|---|---|
| 2,663,706 | Conroy et al. | Dec. 22, 1953 |
| 2,826,578 | Perron | Mar. 11, 1958 |
| 2,861,072 | Weston et al. | Nov. 18, 1958 |
| 2,883,389 | Jucker et al. | Apr. 21, 1959 |
| 2,905,590 | Schmutz | Sept. 22, 1959 |
| 2,913,458 | Druey et al. | Nov. 17, 1959 |
| 2,922,786 | Sam et al. | Jan. 26, 1960 |

FOREIGN PATENTS

| | | |
|---|---|---|
| 73,645 | Netherlands | Nov. 16, 1953 |

OTHER REFERENCES

Wertheim: Textbook of Organic Chemistry, page 285 (second edition) (1945).

Norton et al.: Jour. Amer. Chem. Soc., vol. 68, pages 1330–1331 (1946).

Sharp: Jour. Chem. Soc., pages 2961–2963 (1951).

Sobell et al.: Proceedings, Society for Experimental Biology and Medicine, vol. 90, pages 594–596 (1955).

Wagner and Zook: Synthetic Organic Chemistry, pages 665–666 (1953).